Oct. 25, 1932.  A. F. KOPPEL ET AL  1,883,960

STOP VALVE FOR LIQUID OR GASEOUS SUBSTANCES

Filed Sept. 30, 1929    2 Sheets-Sheet 1

*Inventors:*
*Arthur Fritz Koppel*
*and Max Albrecht.*

*Attorney.*

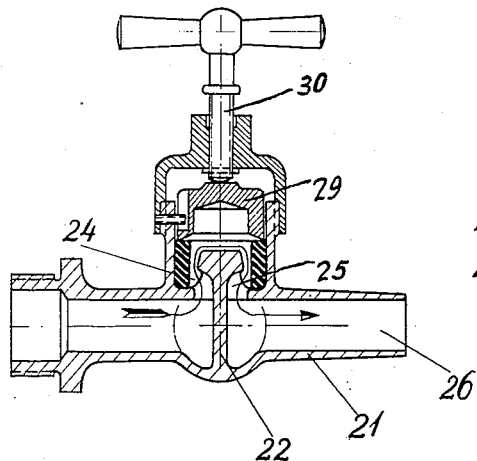
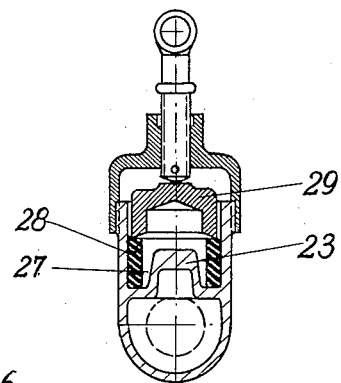
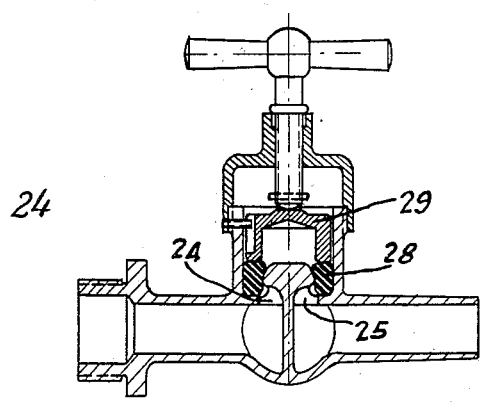

Patented Oct. 25, 1932

1,883,960

UNITED STATES PATENT OFFICE

ARTHUR FRITZ KOPPEL, OF BERLIN-TEMPELHOF, AND MAX ALBRECHT, OF NEUEN-HAGEN, NEAR BERLIN, GERMANY; SAID ALBRECHT ASSIGNOR TO SAID KOPPEL

STOP VALVE FOR LIQUID OR GASEOUS SUBSTANCES

Application filed September 30, 1929, Serial No. 396,307, and in Germany April 12, 1929.

The present invention relates to a valve which in principle is intended for all kinds of pressure pipe lines for liquid or gaseous matter, as for instance, oxygen, hydrogen, compressed air, lighting gas and so on. The advantages of the invention are to be seen in a materially increased safety of the tightening means, in a simple substitution of such tightening means, as compared with known constructions, while the safety and reliable operation of the device is increased in contradistinction to the types employed up to the present. Besides, the manufacturing expenses are lower and the manipulation of the device is easier than before.

Some embodiments of the invention are shown by way of example in the drawings, which refer in particular to a water cock, which can be employed however, with equal advantage also for other liquids or with gases, without deviating from the principle of the invention.

Figures 6 and 7 show in longitudinal section and transverse section respectively another embodiment of the valve opened, and Figure 8 shows the same valve in closed condition.

With this embodiment, adapted to the mode of execution customary up to the present, the same kind of closing means is used as with the valves represented in Figures 1 to 5, but the movement of the closing member is effected in a direction perpendicular to the direction of flow.

Figure 1:
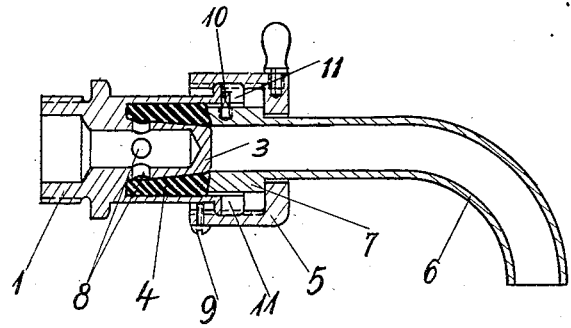
Figure 1 is a section of the closed valve.
Figure 2:
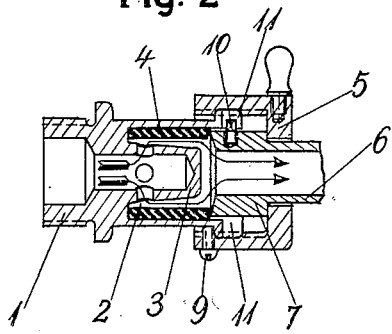
Figure 2 shows the same valve open.
Figure 3:
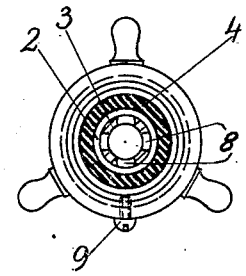
Figure 3 is a transverse section showing the closing element in elevation.

According to the construction represented in Figures 1 to 3 a connection nipple 1 is provided, which serves for the connection of the valve to the pipe line passing the liquid or gas to said valve. This connection can be effected in any desired manner, for instance by means of threads or flanged discs. The nipple 1 possesses a concentric chamber 2, which is formed on the one part by the outer wall of said nipple and on the other part by an orificed member 3, which latter is situated in the axis of the said nipple. The said member 3 can be formed integral with the nipple 1 or it may be secured to it in any suitable manner. The chamber 2 contains a closing member, consisting of an elastic tube, preferably of india rubber. On the front end of the connection nipple 1 there is provided on the outside thereof a flange with which engages a cap-member 5. The said cap-member embraces a discharge pipe 6, which is provided on the portion embraced by said member with a collar 7. In the said member 3 there are provided radial openings 8 for the passage of the substance, the blow of which is to be regulated. A set screw or bolt 9 prevents the cap-member from being released beyond the admissible limit, which bolt will abut against a thicker portion of the outer wall of said nipple. The guiding of the discharge pipe 6 and the collar 7 connected therewith is effected by means of a pin 10 or the like, which is free to reciprocate in a recess 11 at the end of the wall of the nipple, but which will prevent the discharge pipe 6 together with the collar 7 forming the pressure member for the tightening means, from turning. In order to adjust the discharge pipe 6 without dependency on the position of the nipple 1 in any specified direction, preferably several recesses 11 are provided on the periphery of the wall of the said nipple. In order to facilitate the manipulation of the cap-member it may be provided with one or more handles, or it may be of such a form, that a turning thereof can only be carried out by means of a special tool.

The medium to be regulated can pass through the openings 8 of the member 3 arranged in the center of the chamber 2, to the discharge pipe 6 as indicated by arrows in Figure 2. If, however, the cap-member 5 is moved toward the nipple inlet the collar 7 of the discharge pipe 6 will compress the elastic tube 4 and deform it. But as any deformation of said tube towards the outer periphery is prevented by the wall of the chamber embracing the said elastic tube, the deformation takes place towards the inside in the direction of the member 3 by which action the radial passages provided in the member 3 are closed, since the said elastic tube 4 will tightly engage with its inner wall the outer wall of the member 3. Owing to the pressure upon the elastic tube all joints between the individual parts of the valve are rendered tight simultaneously. If on the contrary the cap-member is moved in a reverse direction, the discharge pipe 6 together with the collar 7 are forced back owing to the elasticity of the tube 4 and the discharge openings 8 of the member 3 opened again. The medium is now free to pass through the channel formed between the elastic tube and the member 3. The forcing back of the pressure member 7 and the reformation of the elastic tube to its initial shape is assisted by the pressure of the medium flowing through, which pressure is directed against the inner walls of the said elastic tube and will remove the surfaces of said tube from the surfaces of the member 3.

The movement of the cap-member 5 and the pressure member 7 is limited by means of the screw 9 in such a manner, that the elastic tube 4 will always remain under pressure even if the valve is open, and while in that position said tube 4 will thus also render tight all joints of the valve and all mutual engaging surfaces of the movable parts respectively, so that a deviation of the medium passing through from the prescribed path is prevented.

As already mentioned a rotary movement of the pressure element 7 is prevented by the pin 10 sliding in one of the grooves 11. By this means also a transmission of rotary movement to the elastic tube 4 is avoided, which latter is subjected to pressure only in axial direction, by which the life of said tube is greatly prolonged. Naturally, the length of the grooves 11 is such, that even at a full opening of the valve the guidance of the pressure element will be maintained.

Figure 4:
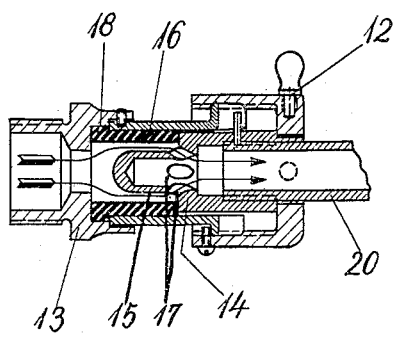
Figure 4 shows a modification of the valve and in open position.
Figure 5:
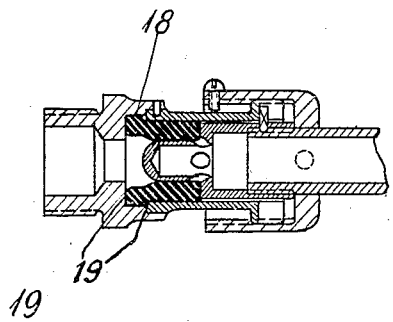
Figure 5 shows the valve according to Figure 4 in closed position.
Figure 5:

In Figures 4 and 5 a modified form of the valve is shown in opened and closed position. Here the nipple 13 is provided with a tube-like extension, which forms the space for the accommodation of a portion of the elastic tube. Through the movement of the cap-member 12 the pressure element 14 connected with the discharge pipe is moved and consequently the orificed member 15 attached to said pressure element or integral with the latter is moved in axial direction of the valve. Through the pressure upon the elastic tube 16 the latter is deformed and forced against the member 15 and its channels 17 exactly in the same manner as described in respect of the device shown in Figures 1 to 3, by which action an intimate engagement and a neat tightening of all joints is obtained. The said elastic tube 16 can be provided at one extremity with a thickened portion or flange 18, by means of which it is held in the nipple 13 through the inner collar 19, but this is not absolutely necessary, since a displacement or distortion of the elastic tube is prevented through the constant pressure. The discharge pipe 20 in this instance is likewise securely connected to the pressure element 14.

Figures 6, 7 and 8 show another modification of the device according to the invention in which the closing and the motion of the closing member is not effected in the direction of the incoming or outgoing flow, but in a direction perpendicular thereto. For that purpose the valve casing 21 is provided with a partition 22 having at its upper extremity an enlarged portion 23. This latter together with the walls of the valve casing forms the orificed member provided with channels or openings 24 and 25 which are disposed substantially radial to said members. The medium passing through will thus enter through the bore of the nipple and is now forced by said partition to flow in the direction of the arrow through the channel 24, the chamber 27, and the channel 25 to the discharge opening 26. By the deformation of the elastic tube 28 concentrically surrounding the orificed member in this case too, the passages 24 and 25 are closed and at the same time all joints of the valve are rendered tight. The deformation of the elastic tube is effected by means of the pressure cap 29, which is moved by a stem 30 provided with a handle or the like.

With all the examples shown in Figures 1-5, which can be modified of course, without departing from the scope of the invention, the radial openings of the member 3 or 15 are closed through pressure exerted in the direction of the axis of said member upon an elastic tube concentrically surrounding said member.

We claim:

1. Stop valve for liquid or gaseous substances in which the passage of the medium is controlled by means of a compressible elastic tube, comprising in combination an elastic tube, means for compressing the elastic tube in an axial direction, a member having radial discharge openings, and said elastic tube concentrically surrounding said member and closing said radial openings when compressed.

2. A stop valve of the kind referred to comprising in combination an elastic means, means for compressing the elastic means in an axial direction, a member having radial discharge openings, said elastic means concentrically surrounding said member and closing said radial openings when compressed by said compressing means, said elastic means adapted under the pressure of the medium flowing through the valve to move from said member when released from said compressing means.

3. Stop valve of the kind referred to comprising in combination an elastic means, means for compressing the elastic means in an axial direction only, and a member concentrically surrounded by said elastic means and having radial openings, which are closed by said elastic means under the pressure of said compressing means.

4. Stop valve of the kind referred to comprising in combination a discharge pipe serving as compressing means, an elastic means adapted to be compressed by said compressing means in an axial direction, and a member concentrically surrounded by said elastic means and having radial openings, which are closed by said elastic means when the latter is compressed by said compressing means.

5. Stop valve of the kind referred to comprising in combination, a nipple, an elastic medium, a cap-member, means for compressing said elastic medium in axial direction, said compressing means being movable in axial direction by moving inwardly said cap-member on said nipple, and an orificed member concentrically surrounded by said elastic medium, said member having radial openings which are closed by said elastic medium when compressed, and opened when the pressure is relieved.

6. A stop valve of the kind referred to comprising in combination, a nipple, a cap member, an elastic medium adapted to be compressed thereby, and a member communicating with said nipple and concentrically surrounded by said elastic medium and having radial openings, the opening and closing of which is governed by the compression and elastic reaction of said elastic medium.

7. Stop valve of the kind referred to comprising in combination compressing means, a member provided with radial openings, a connecting nipple for said member, a chamber provided in said nipple and concentrically surrounding said member and an elastic medium arranged in said chamber, said chamber serving to prevent displacement of said elastic medium.

8. Stop valve of the kind referred to comprising in combination a member provided with radial openings and connected with a tubular movable compressing means, and an elastic medium adapted to be compressed by said compressing means and to seal said radial openings when compressed and unseal them upon release of such pressure.

9. Stop valve of the kind referred to comprising in combination a tubular elastic medium to be compressed, an orificed member within said elastic medium, a chamber concentrically surrounding said member and elastic medium and a tubular element bearing against the elastic medium and coacting therewith to force the elastic medium against the orificed member to close the orifices therein, all of said parts being arranged perpendicularly to the direction of flow of the medium, and a partition by which the medium is conducted into the said chamber and out of said chamber.

10. A stop valve for liquid or gaseous substances comprising in combination a tubular member through which the substances flow, the said member having a closed end and passages through which the substances flow substantially radially with respect to the axis of the said member and from within the member outwardly, and an elastic means concentrically surrounding the said passages and operative to close the same when compressed.

In testimony whereof we have affixed our signatures.

ARTHUR FRITZ KOPPEL.
MAX ALBRECHT.